(12) United States Patent
Zhang

(10) Patent No.: US 12,495,462 B2
(45) Date of Patent: Dec. 9, 2025

(54) NETWORK ARCHITECTURE FOR VIRTUAL MOBILE PHONES

(71) Applicant: Citrix Systems, Inc., Fort Lauderdale, FL (US)

(72) Inventor: Wenshuang Zhang, Nanjing (CN)

(*) Notice: Subject to any disclaimer, the term of this patent is extended or adjusted under 35 U.S.C. 154(b) by 1047 days.

(21) Appl. No.: 17/306,578

(22) Filed: May 3, 2021

(65) Prior Publication Data

US 2022/0338292 A1    Oct. 20, 2022

Related U.S. Application Data

(63) Continuation of application No. PCT/CN2021/087343, filed on Apr. 15, 2021.

(51) Int. Cl.

| H04W 76/20 | (2018.01) |
| G06F 9/48 | (2006.01) |
| H04M 1/72403 | (2021.01) |
| H04W 8/24 | (2009.01) |
| H04W 76/10 | (2018.01) |

(52) U.S. Cl.
CPC .......... *H04W 76/20* (2018.02); *G06F 9/4862* (2013.01); *H04M 1/72403* (2021.01); *H04W 8/24* (2013.01); *H04W 76/10* (2018.02)

(58) Field of Classification Search
CPC ....... H04W 76/20; H04W 8/24; H04W 76/10; G06F 9/4862; G06F 9/485; G06F 9/5077; H04M 1/72403
See application file for complete search history.

(56) References Cited

U.S. PATENT DOCUMENTS

| 8,812,871 B2* | 8/2014 | Monclus | G06F 21/53 |
| | | | 713/189 |
| 10,848,943 B2 | 11/2020 | Cao | |
| 11,108,868 B2* | 8/2021 | San | H04L 65/4015 |
| 2009/0325562 A1* | 12/2009 | Hough | H04M 1/725 |
| | | | 455/418 |

OTHER PUBLICATIONS

"Virtual Smart Phones in the Cloud" https://svmp.github.io/ website visited Aug. 3, 2021, pp. 1-3.

* cited by examiner

*Primary Examiner* — Kibrom T Hailu

(57) ABSTRACT

Disclosed herein are examples of systems and methods that may provide multiple virtual mobile phones for a user. For example, a back-end enterprise computer network architecture may interact with an application installed on a client device. Using the application, the user may generate multiple virtual mobile phones for different purposes, e.g., a "work" phone and a "personal" phone. The computer network architecture may further allow the user to label data to correspond to the different virtual mobile phones for an efficient storage and retrieval of the data. A back-end session manager may allow the user to seamlessly switch between the different virtual mobiles within a single client device or across multiple client devices.

12 Claims, 11 Drawing Sheets

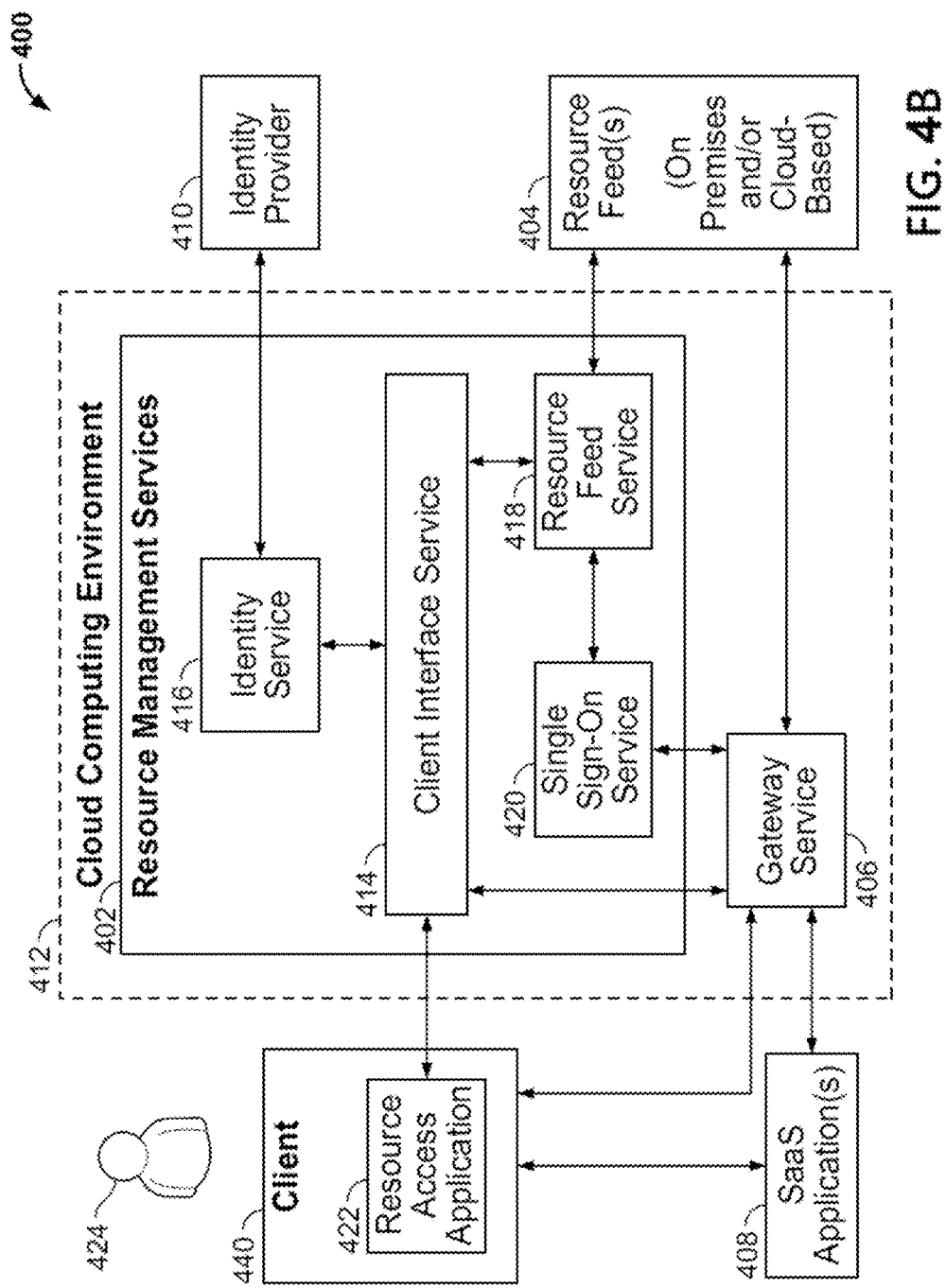

NETWORK ARCHITECTURE FOR VIRTUAL MOBILE PHONES

This application is a continuation of and claims priority to co-pending PCT Application No. PCT/CN2021/087343, filed Apr. 15, 2021, and entitle "Network Architecture for Virtual Mobile Phones", which is incorporated herein by reference in entirety.

FILED OF ART

Aspects described herein generally relate to enterprise computer network architecture, and particularly to a network architecture to support multiple virtual mobile phones that may be accessed from a single client device or across multiple client devices.

BACKGROUND

An enterprise computer network may have to support mobile phones, as mobile computing is getting increasingly ubiquitous in this day and age. For instance, enterprise users may use mobile phones for communication through conventional telephony, voice over internet protocol (VoIP), e-mails, and/or other messaging/communication protocols. Enterprise users may further use mobile phones for other computing and networking tasks such as document generation and storage, data access, data processing, etc. However, mobile phones generally have a shorter replacement cycle lengths compared to conventional computing devices such as laptop computers and desktop computers, and each replacement may come with the hassle of enterprise configuration and customization. Furthermore, mobile phones are more personal than conventional enterprise provided devices (e.g., laptop/desktop computers). Users may therefore be hesitant to handover their mobile phones to enterprise information technology departments for enterprise configuration and customization. Configuring and customizing mobile phones for enterprise users through these frequent replacements may thus sometimes be difficult. Additionally, enterprise configuration and customization may force some users to maintain multiple mobile phones, for example, a first mobile phone for personal use and a second mobile phone for enterprise use, which may be cumbersome to the user.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome the technical limitations described above, and to overcome other technical limitations that will be apparent upon reading and understanding the present specification, aspects described herein are directed towards an enterprise network architecture that may support multiple virtual mobile phones for a user within a single client device (e.g., a physical mobile phone such as a smartphone). The user therefore may not have to be confined to the configuration of the client device, but may have multiple customized virtual mobile phones within the client device. For instance, a first virtual mobile phone may be customized and used for work purposes and a second virtual mobile phone may be customized and used for personal purposes.

The network architecture may provide multiple templates for the virtual mobile phones for the user to customize. The network architecture may allow for the labeling of the data for the different virtual mobile phones such that the data can be stored, accessed, and edited in an organized fashion. The network architecture may allow for separate session management such that the user may switch between different virtual mobiles from a single client device or across different client devices. The client device(s) may therefore function as a input-output device with the back-end network architecture providing majority of the functionality.

In one example, a method may comprise maintaining, by a computing device, a first session for a first virtual mobile phone; receiving a request to switch from the first virtual mobile phone to a second virtual mobile phone; storing first session data associated with the first session; retrieving second session data associated with a second session for the second virtual mobile phone; and providing the second virtual mobile phone based on the retrieved second session data.

In another example, a method may comprise receiving, by a computing device, a request to generate a virtual mobile phone; selecting an operating system for the virtual mobile phone based on a first input received from a client device; receiving, from the client device, data for the virtual mobile phone; assigning a set of labels to the data based on a second set of inputs received from the client device; and generating the virtual mobile phone based on the selected operating system, the received data, and the assigned set of labels.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 4A-4C depict another illustrative cloud-based architecture that may be used in accordance with one or more illustrative aspects described herein.

DETAILED DESCRIPTION

Figure 1:
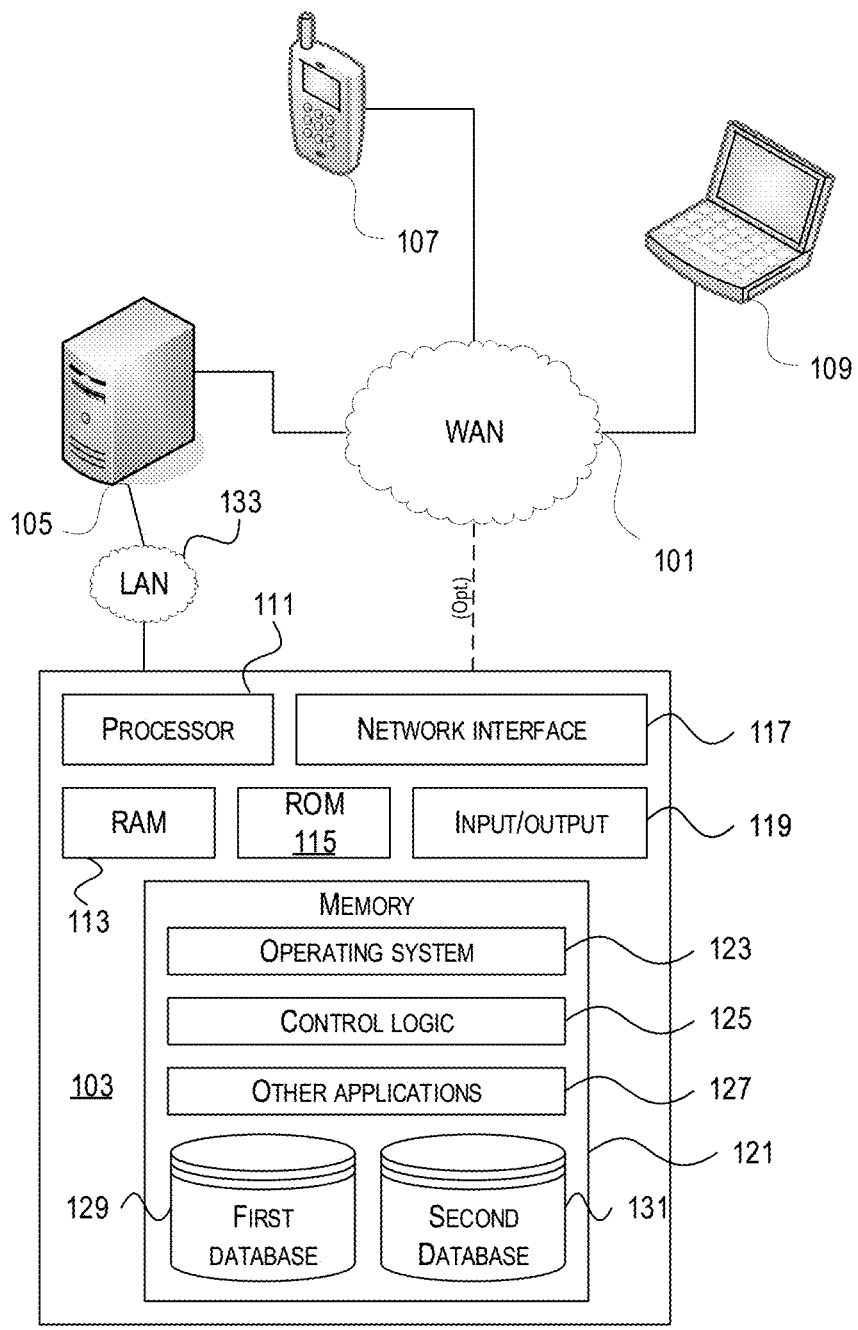
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Enterprise computing architecture may generally support mobile computing. For instance, users (e.g., enterprise employees) may use a mobile client device (e.g., a mobile phone such as a smartphone) for communication (e.g., through conventional telephony or other Internet Protocol based protocols) and to perform other functions associated with the enterprise. However, supporting mobile phones within an enterprise network may have some technical challenges. Mobile phones generally have a shorter replacement cycle compared to conventional computing devices such laptops and desktops. Furthermore, mobile phones may be less accessible to the information technology (IT) departments within the enterprise—e.g., users may be reluctant to hand over their phones for an overnight servicing and configuration.

When a user replaces an old mobile phone with a new mobile phone, installed applications and data (e.g., documents, photos, contacts) from the old mobile phone may have to be transferred to the new mobile phone. The conventional systems and methods for the data transfers are time consuming and inefficient. For instance, the user may have to download and install individual applications in the new mobile phone, and also individually transfer other data (e.g., documents) to the new mobile phone. This process, heavily manual, tends to be very time consuming. In other instances, the user may upload the data and the applications from the old mobile phone to the cloud, and download the uploaded data and applications from the cloud to the new mobile phone. This process is also time consuming and generates unwanted data redundancy, e.g., the same data may be at three places: the old mobile phone, the new mobile phone, and the cloud. Another conventional method includes copying directly (e.g., using one-click copy) from the old mobile phone to the new mobile phone. However, this process is time consuming as well, because it may take several hours for all the data from the old mobile phone to be transferred to the new mobile phone. During such transfer, both of the devices may be unusable, thereby imposing yet another inconvenience to the user.

Some users may maintain different mobile phones for different purposes. For instance, a user may have a personal mobile phone for handling personal communication and personal data storage, and an enterprise mobile phone for enterprise related activities. Notwithstanding the different purposes, it may be cumbersome for a user to maintain two or more separate devices with substantially similar functionality.

Examples disclosed herein may solve the aforementioned technical problems and may provide technical solutions to other problems as well. An enterprise computer network architecture may allow a user to customize different virtual mobile phones that may be accessed from a single client device (e.g., a physical mobile phone). The network architecture may provide a back-end support for the user to generate different virtual mobile phones and switch between thus generated virtual mobile phones. In some cases, therefore, the client device may function just as an input/output device with the majority of the functionality implemented in the virtual mobile phones with a back-end support of the network architecture. In other cases, the client device may share some functionality with the back-end architecture. It should therefore be understood that any combination of local functionality (e.g., local storage) and the back-end functionality provided by the enterprise architecture should be considered within the scope of this disclosure.

The computer network architecture may facilitate the user to customize a plurality of virtual mobile phones. For this purpose, the computer network architecture may maintain a plurality of virtual mobile phone templates. These templates may be based on, for example, commonly used operating systems such as Android, iOS, or Windows mobile. When a user desires to generate a new virtual mobile phone, the user may select one of the templates. The user may make this selection from an application installed on the user's client device. Based on the selected template, the user may further customize the virtual mobile phone. For instance, the user may configure the hardware resources (e.g., memory) for the virtual mobile phone. The computer network architecture may further provide additional software features for the user to add and/or customize for the selected template. For instance, the user may be able to install an application on the selected virtual phone and/or configure a functionality in additional to the base functionality provided by the operating system.

The computer network architecture may also allow the user to label data for the different virtual mobile phones. The computer network architecture may have some pre-defined labels, such as "personal" or "work." The user may define other labels, such as "work—management," or "work—sales." Using these labels, the computer network architecture may allow for storage, update, and/or retrieval of data in an organized and efficient fashion. For instance, when the user is operating a "work" virtual mobile phone and requests a piece of data, the computer network architecture may just query the data tagged with the label "work" without necessarily querying the data with other labels. It should however be understood that a piece of data may have multiple different labels. For instance, the user may tag a document both as "personal" and "work," and the computer network architecture may adjust the query accordingly.

The computer network architecture may further facilitate the user to switch between different virtual mobile phones from one client device or from different client devices. For instance, the user may use an application installed on the client device to retrieve the different virtual mobile phones associated with the user. Using an interface showing a listing or a representation (e.g., icons) of the different virtual mobile phones, the user may switch from the virtual mobile phone being used to another virtual mobile phone.

The computer network architecture may allow the usage of the same virtual mobile phone across different client devices. For instance, the user may be using a virtual mobile phone in a first client device. Because the computer network architecture may use a session manager for the virtual mobile phone, the user may continue the same virtual mobile phone session in a second client device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and their equivalents. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes only and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107 (e.g., a mobile phone), 109 (e.g., a laptop computer). Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers (also referred to as client devices) 107, 109 may be used in concert with data server 103 to access data stored therein, or may be used for other purposes. For example, from client computer 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

The components 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
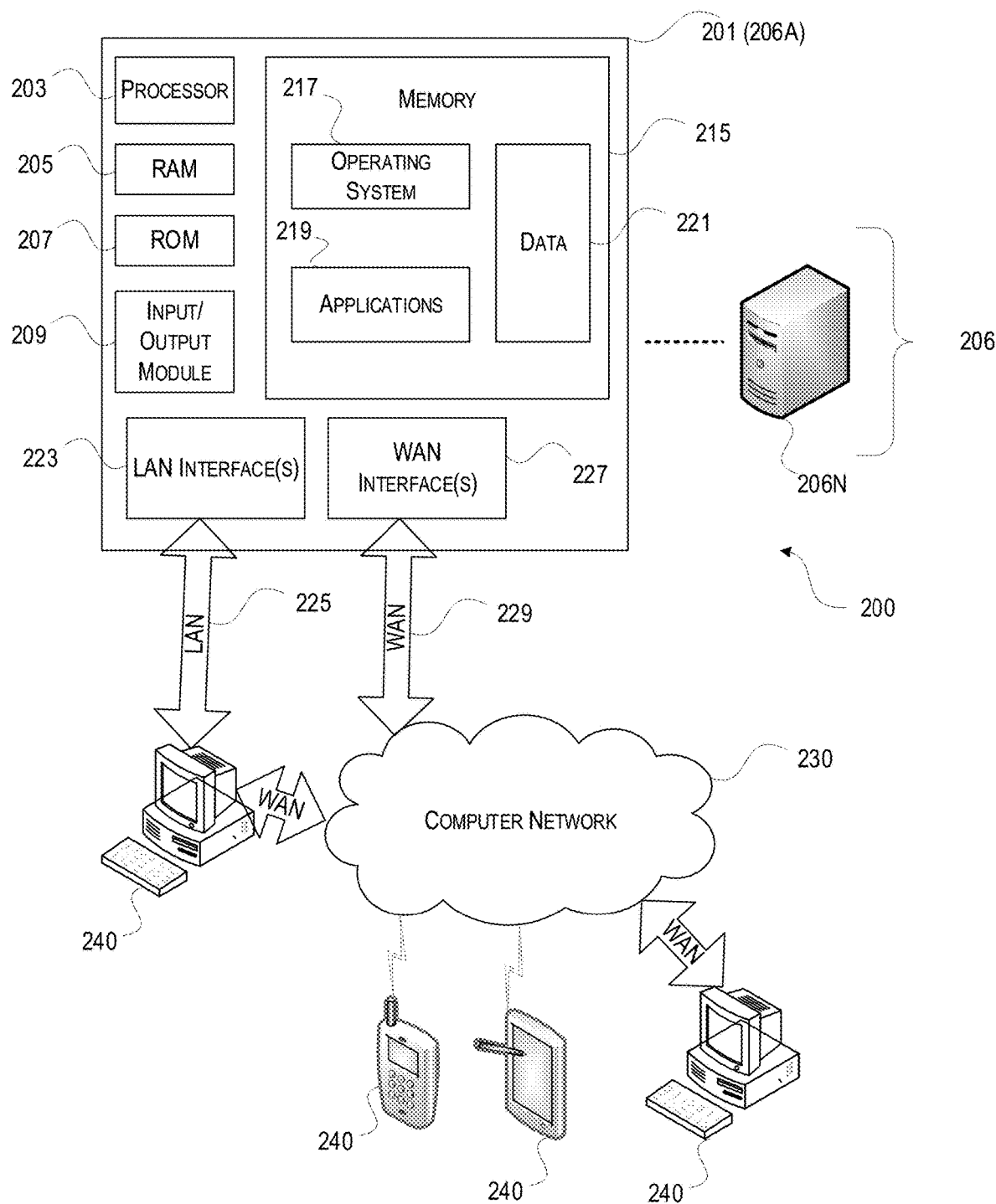
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application may comprise a desktop, while in other examples the application may comprise an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-

206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown). First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
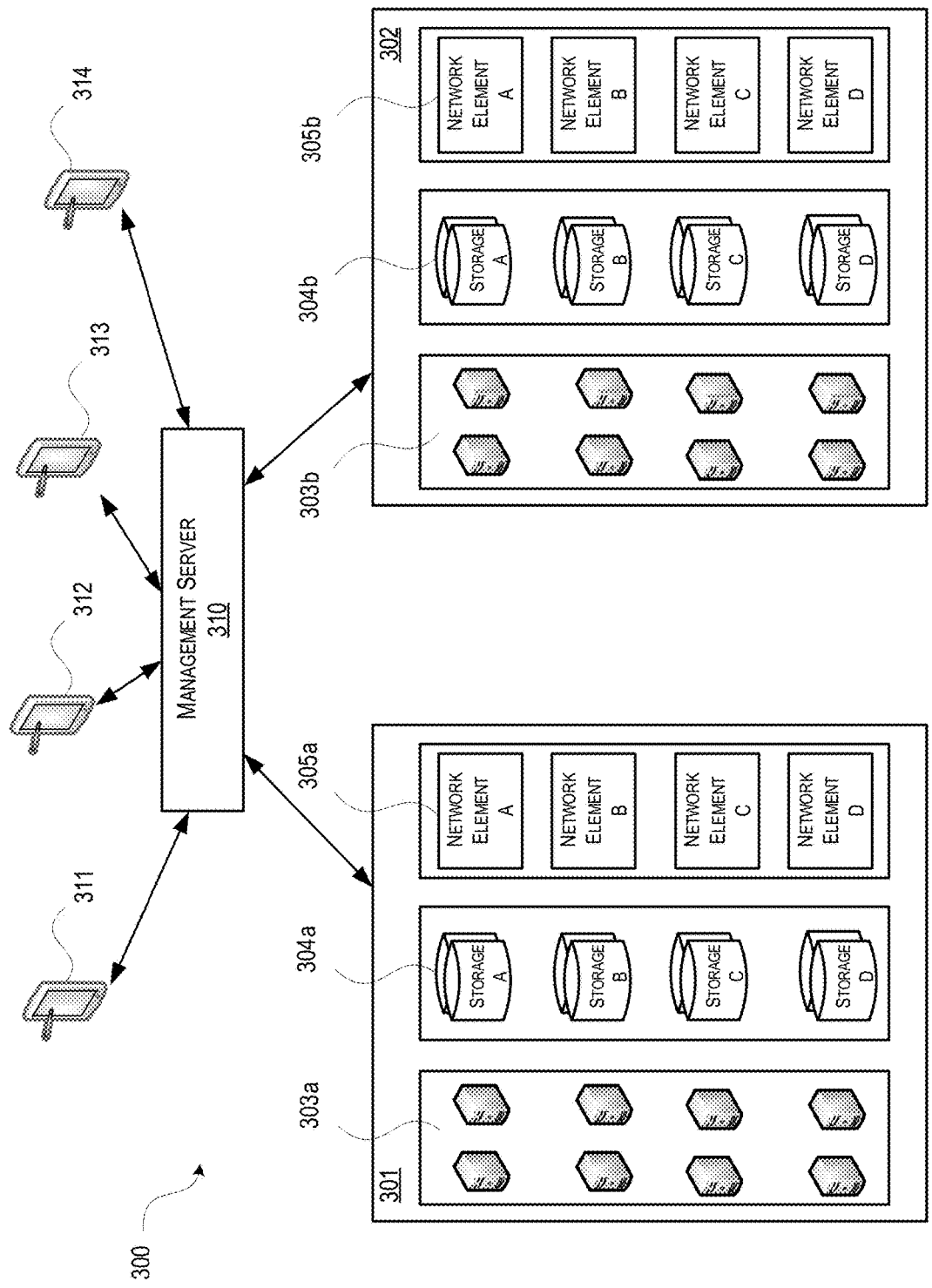
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 (e.g., mobile phones) may communicate with a cloud management server 310 to access the computing resources (e.g., host servers 303a-303b (generally referred herein as "host servers 303"), storage resources 304a-304b (generally referred herein as "storage resources 304"), and network elements 305a-305b (generally referred herein as "network resources 305")) of the cloud system.

Management server 310 may be implemented on one or more physical servers. The management server 310 may run, for example, Citrix Cloud by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. A zone may include an internal network that interfaces with devices that are outside of the zone, such as the management server 310, through a gateway. End users of the cloud (e.g., clients 311-314) may or may not be aware of the distinctions between zones. For example, an end user may request the creation of a virtual mobile phone having a specified amount of memory, processing power, and network capabilities. The management server 310 may respond to the user's request and may allocate the resources to create the virtual mobile phone without the user knowing whether the virtual mobile phone was created using resources from zone 301 or zone 302.

In this example, the zones 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

Figure 4A:
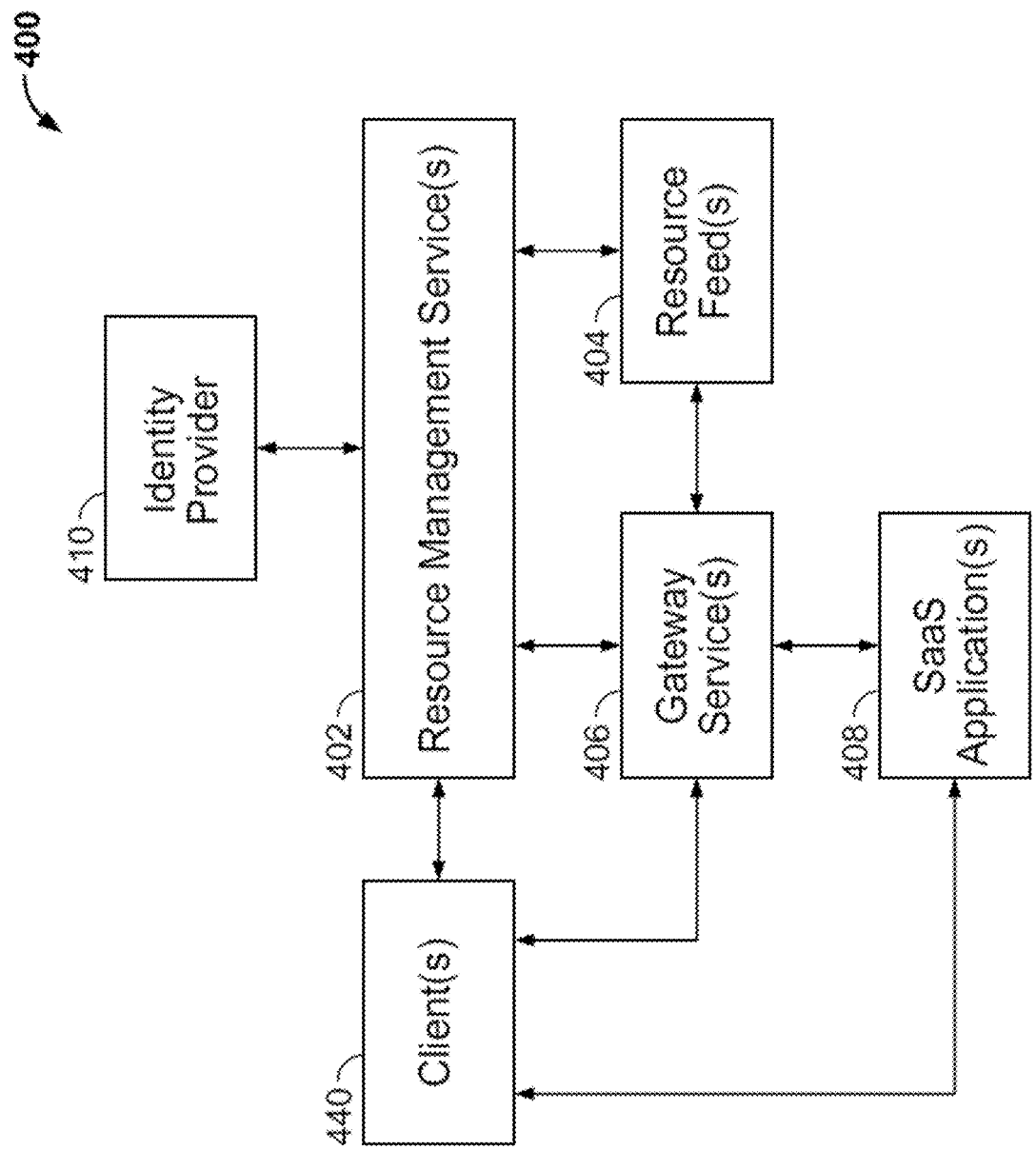

FIG. 4A is a block diagram of an example multi-resource access system 400 in which one or more resource management services 402 may manage and streamline access by one or more clients 440 (e.g., mobile phones) to one or more resource feeds 404 (via one or more gateway services 406) and/or one or more software-as-a-service (SaaS) applications 408. In particular, the resource management service(s) 402 may employ an identity provider 410 to authenticate the identity of a user of a client 440 and, following authentication, identify one of more resources the user is authorized to access. In response to the user selecting one of the identified resources, the resource management service(s) 402 may send appropriate access credentials to the requesting client 440, and the client 440 may then use those credentials to access the selected resource. For the resource feed(s) 404, the client 440 may use the supplied credentials to access the selected resource via a gateway service 406. For the SaaS application(s) 408, the client 440 may use the credentials to access the selected application directly.

The client(s) 440 may be any type of computing devices capable of accessing the resource feed(s) 404 and/or the SaaS application(s) 408, and may, for example, include a variety of desktop or laptop computers, mobile phones, tablets, etc. The resource feed(s) 404 may include any of numerous resource types and may be provided from any of numerous locations. In some embodiments, for example, the resource feed(s) 404 may include one or more systems or services for providing virtual mobile phones to the client(s) 440, one or more file repositories and/or file sharing systems, one or more secure browser services, one or more access control services for the SaaS applications 408, one or more management services for local applications on the client(s) 440, one or more Internet enabled devices or sensors, etc. The resource management service(s) 402, the resource feed(s) 404, the gateway service(s) 406, the SaaS application(s) 408, and the identity provider 410 may be located within an on-premises data center of an organization for which the multi-resource access system 400 is deployed, within one or more cloud computing environments, or elsewhere.

FIG. 4B is a block diagram showing an example implementation of the multi-resource access system 400 shown in FIG. 4A in which various resource management services 402 as well as a gateway service 406 are located within a cloud computing environment 412. The cloud computing environment may, for example, include Microsoft Azure Cloud, Amazon Web Services, Google Cloud, or IBM Cloud. It should be appreciated, however, that in other implementations, one or more (or all) of the components of the resource management services 402 and/or the gateway service 406 may alternatively be located outside the cloud computing environment 412, such as within a data center hosted by an organization.

For any of the illustrated components (other than the client 440) that are not based within the cloud computing environment 412, cloud connectors (not shown in FIG. 4B) may be used to interface those components with the cloud computing environment 412. Such cloud connectors may, for example, run on Windows Server instances and/or Linux Server instances hosted in resource locations and may create a reverse proxy to route traffic between those resource locations and the cloud computing environment 412. In the illustrated example, the cloud-based resource management services 402 include a client interface service 414, an identity service 416, a resource feed service 418, and a single sign-on service 420. As shown, in some embodiments, the client 440 may use a resource access application 422 to communicate with the client interface service 414 as well as to present a user interface on the client 440 that a user 424 can operate to access the resource feed(s) 404 and/or the SaaS application(s) 408. The resource access application 422 may either be installed on the client 440, or may be executed by the client interface service 414 (or elsewhere in the multi-resource access system 400) and accessed using a web browser (not shown in FIG. 4B) on the client 440.

When the resource access application 422 is launched or otherwise accessed by the user 424, the client interface service 414 may send a sign-on request to the identity service 416. In some embodiments, the identity provider 410 may be located on the premises of the organization for which the multi-resource access system 400 is deployed. The identity provider 410 may, for example, correspond to an on-premises Windows Active Directory. In such embodiments, the identity provider 410 may be connected to the cloud-based identity service 416 using a cloud connector (not shown in FIG. 4B), as described above. Upon receiving a sign-on request, the identity service 416 may cause the resource access application 422 (via the client interface service 414) to prompt the user 424 for the user's authentication credentials (e.g., user-name and password). Upon receiving the user's authentication credentials, the client interface service 414 may pass the credentials along to the identity service 416, and the identity service 416 may, in turn, forward them to the identity provider 410 for authentication, for example, by comparing them against an Active Directory domain. Once the identity service 416 receives confirmation from the identity provider 410 that the user's identity has been properly authenticated, the client interface service 414 may send a request to the resource feed service 418 for a list of subscribed resources for the user 424.

In other embodiments (not illustrated in FIG. 4B), the identity provider 410 may be a cloud-based identity service, such as a Microsoft Azure Active Directory. In such embodiments, upon receiving a sign-on request from the client interface service 414, the identity service 416 may, via the client interface service 414, cause the client 440 to be redirected to the cloud-based identity service to complete an authentication process. The cloud-based identity service may then cause the client 440 to prompt the user 424 to enter the user's authentication credentials. Upon determining the user's identity has been properly authenticated, the cloud-based identity service may send a message to the resource access application 422 indicating the authentication attempt was successful, and the resource access application 422 may then inform the client interface service 414 of the successfully authentication. Once the identity service 416 receives confirmation from the client interface service 414 that the user's identity has been properly authenticated, the client interface service 414 may send a request to the resource feed service 418 for a list of subscribed resources for the user 424.

The resource feed service 418 may request identity tokens for configured resources from the single sign-on service 420. The resource feed service 418 may then pass the feed-specific identity tokens it receives to the points of authentication for the respective resource feeds 404. The resource feeds 404 may then respond with lists of resources configured for the respective identities. The resource feed service 418 may then aggregate all items from the different feeds and forward them to the client interface service 414, which may cause the resource access application 422 to present a list of available resources on a user interface of the client 440. The list of available resources may, for example, be presented on the user interface of the client 440 as a set of selectable icons or other elements corresponding to accessible resources. The resources so identified may, for example, include one or more file repositories and/or file sharing systems (e.g., Sharefile®, one or more secure browsers, one or more internet enabled devices or sensors, one or more local applications installed on the client 440, and/or one or more SaaS applications 408 to which the user 424 has subscribed. The lists of local applications and the SaaS applications 408 may, for example, be supplied by resource feeds 404 for respective services that manage which such applications are to be made available to the user 424 via the resource access application 422. Examples of SaaS applications 408 that may be managed and accessed as described herein include Microsoft Office 365 applications, SAP SaaS applications, Workday applications, etc.

For resources other than local applications and the SaaS application(s) 408, upon the user 424 selecting one of the listed available resources, the resource access application 422 may cause the client interface service 414 to forward a request for the specified resource to the resource feed service 418. In response to receiving such a request, the resource feed service 418 may request an identity token for the corresponding feed from the single sign-on service 420. The resource feed service 418 may then pass the identity token received from the single sign-on service 420 to the client interface service 414 where a launch ticket for the resource may be generated and sent to the resource access application 422. Upon receiving the launch ticket, the resource access application 422 may initiate a secure session to the gateway service 406 and present the launch ticket. When the gateway service 406 is presented with the launch ticket, it may initiate a secure session to the appropriate resource feed and present the identity token to that feed to seamlessly authenticate the user 424. Once the session initializes, the client 440 may proceed to access the selected resource.

When the user 424 selects a local application, the resource access application 422 may cause the selected local application to launch on the client 440. When the user 424 selects a SaaS application 408, the resource access application 422 may cause the client interface service 414 to request a one-time uniform resource locator (URL) from the gateway service 406 as well a preferred browser for use in accessing the SaaS application 408. After the gateway service 406 returns the one-time URL and identifies the preferred browser, the client interface service 414 may pass that information along to the resource access application 422. The client 440 may then launch the identified browser and initiate a connection to the gateway service 406. The gateway service 406 may then request an assertion from the single sign-on service 420. Upon receiving the assertion, the gateway service 406 may cause the identified browser on the client 440 to be redirected to the logon page for identified SaaS application 408 and present the assertion. The SaaS may then contact the gateway service 406 to validate the assertion and authenticate the user 424. Once the user has been authenticated, communication may occur directly between the identified browser and the selected SaaS application 408, thus allowing the user 424 to use the client 440 to access the selected SaaS application 408.

In some embodiments, the preferred browser identified by the gateway service 406 may be a specialized browser embedded in the resource access application 422 (when the resource access application 422 is installed on the client 440) or provided by one of the resource feeds 404 (when the resource access application 422 is located remotely), e.g., via a secure browser service. In such embodiments, the SaaS applications 408 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 440 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 404) for assessment of its security risk by a web filtering service. For approved URLs, the specialized browser may be permitted to access the link. For suspicious links, however, the web filtering service may have the client interface service 414 send the link to a secure browser service, which may start a new virtual browser session with the client 440, and thus allow the user to access the potentially harmful linked content in a safe environment.

In some embodiments, in addition to or in lieu of providing the user 424 with a list of resources that are available to be accessed individually, as described above, the user 424 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 440 to notify a user 424 of something that requires the user's attention (e.g., approval of an expense report, new course available for registration, etc.).

Figure 4C:
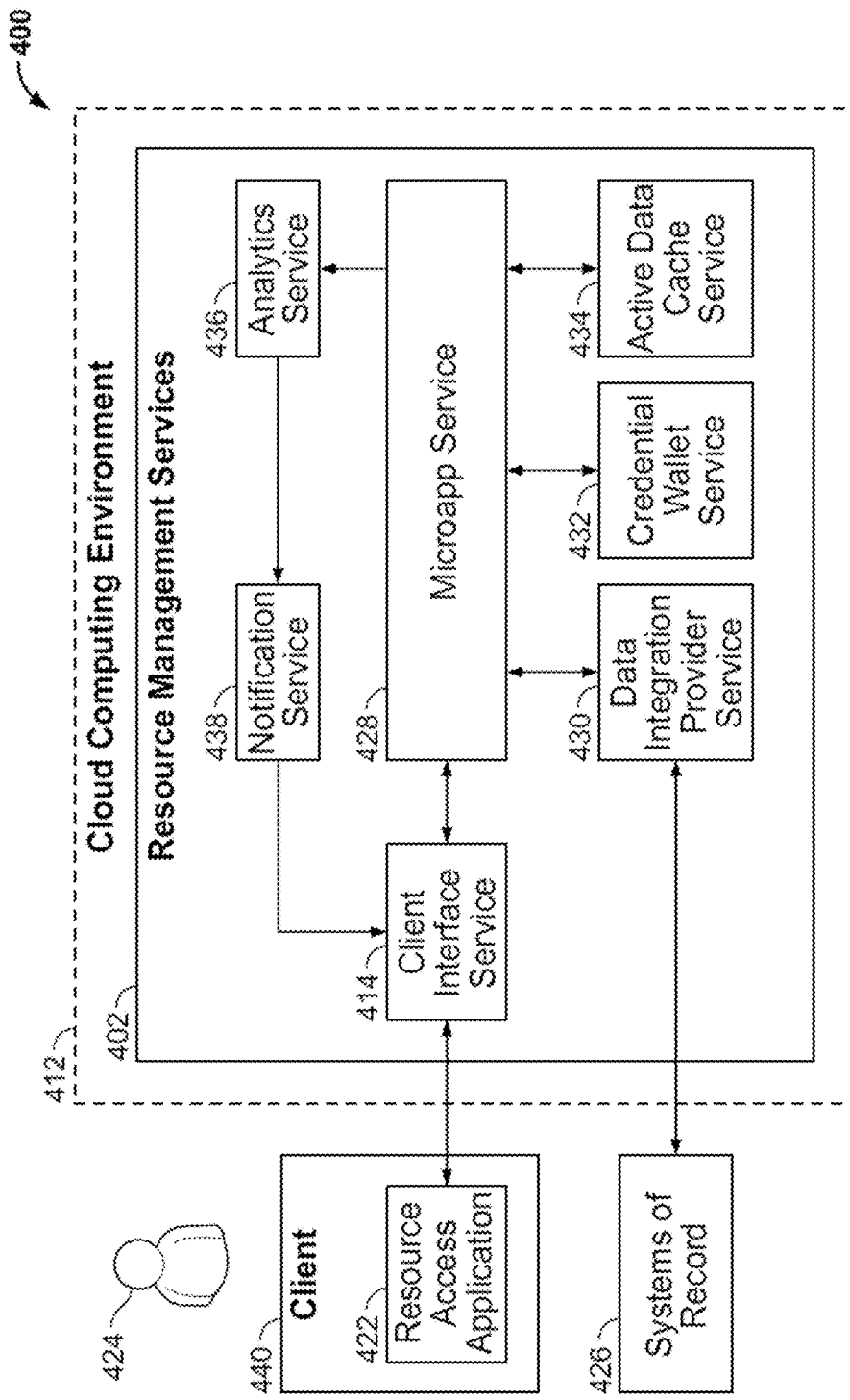

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 426 labeled "systems of record," and further in which several different services are included within the resource management services block 402. As explained below, the services shown in FIG. 4C may enable the provision of a streamlined resource activity feed and/or notification process for a client 440. In the example shown, in addition to the client interface service 414 discussed above, the illustrated services include a microapp service 428, a data integration provider service 430, a credential wallet service 432, an active data cache service 434, an analytics service 436, and a notification service 438. In various embodiments, the services shown in FIG. 4C may be employed either in addition to or instead of the different services shown in FIG. 4B. Further, as noted above in connection with FIG. 4B, it should be appreciated that, in other implementations, one or more (or all) of the components of the resource management services 402 shown in FIG. 4C may alternatively be located outside the cloud computing environment 412, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 422 without having to launch the native application. The system shown in FIG. 4C may, for example, aggregate relevant notifications, tasks, and insights, and thereby give the user 424 a dynamic productivity tool. In some embodiments, the resource activity feed may be intelligently populated by utilizing machine learning and artificial intelligence (AI) algorithms. Further, in some implementations, microapps may be configured within the cloud computing environment 412, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 426 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 430, may, for example, support REST API, JSON, OData-JSON, and 6ML. As explained in more detail below, the data integration provider service 430 may also write back to the systems of record, for example, using OAuth2 or a service account.

In some embodiments, the microapp service 428 may be a single-tenant service responsible for creating the microapps. The microapp service 428 may send raw events, pulled from the systems of record 426, to the analytics service 436 for processing. The microapp service may, for example, periodically cause active data to be pulled from the systems of record 426.

In some embodiments, the active data cache service 434 may be single-tenant and may store all configuration information and microapp data. It may, for example, utilize a per-tenant database encryption key and per-tenant database credentials.

In some embodiments, the credential wallet service 432 may store encrypted service credentials for the systems of record 426 and user OAuth2 tokens.

In some embodiments, the data integration provider service 430 may interact with the systems of record 426 to decrypt end-user credentials and write back actions to the systems of record 426 under the identity of the end-user. The write-back actions may, for example, utilize a user's actual account to ensure all actions performed are compliant with data policies of the application or other resource being interacted with.

In some embodiments, the analytics service 436 may process the raw events received from the microapp service 428 to create targeted scored notifications and send such notifications to the notification service 438.

In some embodiments, the notification service 438 may process any notifications it receives from the analytics service 436. In some implementations, the notification service 438 may store the notifications in a database to be later served in an activity feed. In other embodiments, the notification service 438 may additionally or alternatively send the notifications out immediately to the client 440 as a push notification to the user 424.

In some embodiments, a process for synchronizing with the systems of record 426 and generating notifications may operate as follows. The microapp service 428 may retrieve encrypted service account credentials for the systems of record 426 from the credential wallet service 432 and request a sync with the data integration provider service 430. The data integration provider service 430 may then decrypt the service account credentials and use those credentials to retrieve data from the systems of record 426. The data integration provider service 430 may then stream the retrieved data to the microapp service 428. The microapp service 428 may store the received systems of record data in the active data cache service 434 and also send raw events to the analytics service 436. The analytics service 436 may create targeted scored notifications and send such notifications to the notification service 438. The notification service 438 may store the notifications in a database to be later served in an activity feed and/or may send the notifications out immediately to the client 440 as a push notification to the user 424.

In some embodiments, a process for processing a user-initiated action via a microapp may operate as follows. The client 440 may receive data from the microapp service 428 (via the client interface service 414) to render information corresponding to the microapp. The microapp service 428 may receive data from the active data cache service 434 to support that rendering. The user 424 may invoke an action from the microapp, causing the resource access application 422 to send an action request to the microapp service 428 (via the client interface service 414). The microapp service 428 may then retrieve from the credential wallet service 432 an encrypted Oauth2 token for the system of record for which the action is to be invoked, and may send the action to the data integration provider service 430 together with the encrypted OAuth2 token. The data integration provider service 430 may then decrypt the OAuth2 token and write the action to the appropriate system of record under the identity of the user 424. The data integration provider service 430 may then read back changed data from the written-to system of record and send that changed data to the microapp service 428. The microapp service 428 may then update the active data cache service 434 with the updated data and cause a message to be sent to the resource access application 422 (via the client interface service 414) notifying the user 424 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 422 or directly from another resource, such as Microsoft Teams. This feature may allow employees to work efficiently, stay organized, and deliver only the specific information they're looking for.

Enterprise Computer Network Architecture for Virtual Mobile Phones

The example network architectures described throughout this disclosure may support virtual mobile phones for enterprise users. Using these example network architectures, a user may create multiple virtual mobile phones that may be accessed from a single client device or from multiple client devices. The virtual mobile phones may be used for different purposes, e.g., a "work" virtual mobile phone may be used for work related matters and a "personal" mobile phone may be used for personal matters. The user may further tag data with labels corresponding to the virtual mobile phones— e.g., a "work" document to correspond to the "work" virtual mobile phone, or a "personal" photograph to correspond to the "personal" virtual mobile phone. The user may also switch between different virtual mobile phones from a single client device or from across different client devices.

Figure 5:
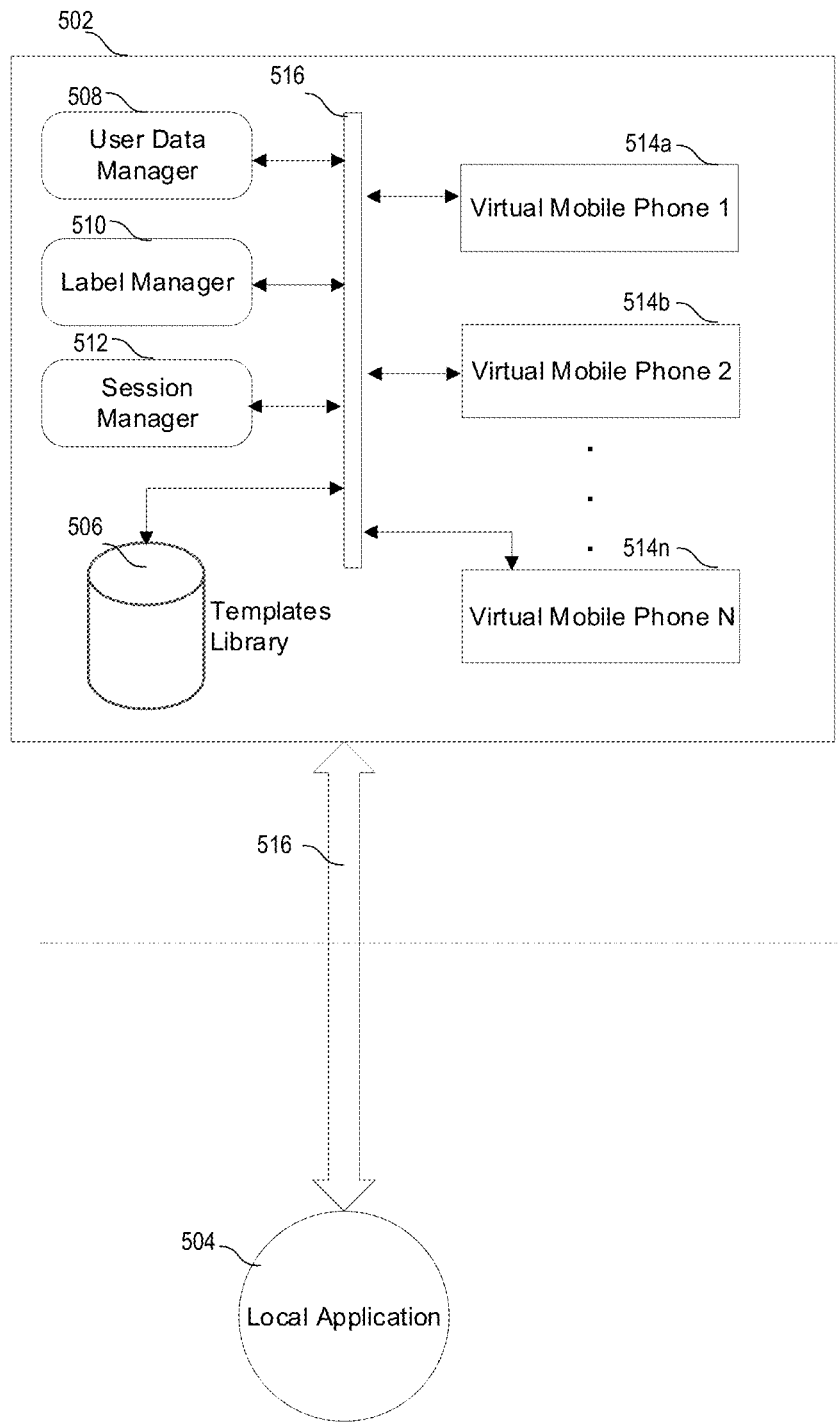
FIG. 5 depicts an illustrative system architecture for multiple virtual mobile phones.

FIG. 5 depicts an illustrative system 500 for generating and switching between different virtual mobile phones. The system 500 may be implemented using any kind of computing device (e.g., computing devices 103, 105, 107, 109 in FIG. 1; computing devices 201, 240, 206 in FIG. 2; computing devices 301, 302, 310, 311, 312, 313, 314 in FIG. 3; and/or computing devices 402, 406, 412, 440 in FIGS. 4A-4C), or any combination thereof. It should be further understood that the system 500 shown in FIG. 5 and described herein is merely illustrative and other systems with additional, alternate, and fewer number of components should also be considered within the scope of this disclosure.

The system 500 may comprise an enterprise network platform 502. The enterprise network platform 502 may provide a back-end support for a local application 504, which may be executing on a client device (not shown). The enterprise network platform 502, which may be implemented on one or more server computers, may comprise a templates library 506, a user data manager 508, a label manger 510, a and a session manager 512. It should however be understood that these components within the enterprise network platform 502 are merely illustrative and should not be considered limiting. These components may communicate to each other through a data bus 516. The enterprise network platform 502 may maintain, support, and execute multiple virtual mobile phones 514a-514n (collectively or commonly referred as 514) using the aforementioned components.

The templates library 506 may store a plurality of templates of virtual mobile phones. The templates may correspond to different mobile phone platforms (e.g., operating systems). For instance, the templates may correspond to Android operating system, iOS operating system, or MS-Windows mobile operating system. The templates may also provide a hardware configuration, e.g., memory and/or processing capacity, for the virtual mobile phones. In addition to the standard templates (e.g., a template based on Android operating system), the system 500 may allow the enterprise network platform 502 to configure its own templates. For instance, a configured template may be based on a standard mobile operating system, but may have additional security features as required by the enterprise. The configured template may further have pre-installed enterprise specific applications.

The virtual templates library 506 may allow a user to select a template and/or customize the template. For instance, the user may select a pre-existing template and then customize the selected template. The customization may include configuring hardware features. For instance, the user may select hardware capabilities (e.g., memory capacity) for the virtual mobile phone 514. The hardware customization may be based on the role of the user within the enterprise—users with managerial or administrative responsibilities may be entitled to a higher capability hardware compared to normal users. The customization may also include configuring software. For instance, the user may request additional applications to be installed. The user may also configure safety features for applications, e.g., configure an application to require a multi-factor authentication. In addition to the hardware and/or software, the user may further configure the "look and feel" of the virtual mobile phone 514. For instance, the user may configure a wallpaper, a screen saver, and/or any other features associated with the look and feel of the virtual mobile phone. The enterprise network 502 may allow for above selections (e.g., an operating system) from any kind of client device. For instance, the client device may have an iOS, but the enterprise network 502 may allow the user (e.g., through the application 504 running on the client device) to select a template with an Android operating system. As another example, the client device may a personal computer with a desktop-class operation system, but the enterprise network 502 may allow a selection of a template with a mobile operating system (e.g., iOS or Android) from the personal computer.

The user data manager 508 may control the storage, retrieval, and update to the user data (e.g., data associated with the user). The user data may include, for example, contact lists, photos, videos, voice memos, and/or any other type of data associated with the user. As the client device may not necessarily store all of the user data locally, the enterprise network platform 502 may have to manage the storage using the user data manager 508. However, it should also be understood that the user data manager 508 may also manage a local storage of the data in the client device. For instance, the client device may store some pieces of data locally for a quicker access and store other pieces of data in the enterprise network platform 502.

The label manager 510 may manage user-defined and/or system-defined labels for the data associated with the virtual mobile phones 514. The system 500 may allow the user to tag data with labels. For instance, the user may tag a document with a label "work" and a photograph with the label "personal." The label manager 510 may receive the labels and store the corresponding document and the photograph in association with its corresponding label. In other instances, the user may provide multiple labels to a piece of data. Another photograph may be labeled, for example, both "work" and "personal." In these instances, the label manager may store the photograph in association with both the labels.

The label manager 510 may also allow a hierarchy of labels. Within the "work" label for instance, there may be labels such as "important" or "confidential." Based on the "confidential" or the "important" label, the label manger 510 may store the associated data with a higher level of security, e.g., requiring an authentication for access and edit. Other examples of hierarchical labels within the "work" label may be "department 1" or "department 2." The label manager 510 may use such hierarchy for an organized storage of the data.

The session manger 512 may manage sessions associated with the virtual mobile phones 514. For instance, the local application may establish a first session with the enterprise computer network 502 for a first virtual mobile phone 514a. When the user makes a selection (e.g., through the local application 504) to switch the first virtual mobile phone 514a to a second virtual mobile phone 514b, the session manager 512 may store the first session and initiate a second session for the second virtual mobile phone. When the user makes a selection (e.g., through the local application 504) to switch back to the first virtual mobile phone 514a, the session manager 512 may store the second session and retrieve the stored first session for the first virtual mobile phone 514a. The enterprise computer network 502 may therefore provide a smooth switching between the different virtual mobile phones 514.

It should also be understood that the user may use different client devices for the virtual mobile phones 514. For instance, the user may use a first client mobile device to access and use the first virtual mobile phone 514. The user may switch to a second client device. In response, the session manger 512 may store the session of communication with the first client device and retrieve the session for communicating with the second client device. Therefore, the computer network infrastructure 502 may allow for a smooth and seamless switching between different client devices through the use of the virtual mobile phones 514.

Therefore, it can be understood that the virtual mobile phones 514 may be agnostic to the client device executing the local application 504. For instance, the user may use a single client device for multiple virtual mobile phones 514. In other instances, the user may use multiple client devices for a single virtual mobile phone 514. As the session information may be stored on and/or retrieved from the enterprise computer network 502, the system 500 may allow the user flexibility in using different client devices and maintaining multiple virtual mobile phones 514.

Furthermore, as the enterprise network platform 502 may execute the virtual mobile phones 514, the virtual mobile phones 514 may be agnostic to the operating system of the client device. For instance, the client device may access the virtual mobile phones 514 as a thin client, the functionality of the virtual mobile phones 514 being provided by the enterprise network platform 502. Therefore, the client device may be executing a different operating system than the virtual mobile phones. For example, a client device may be an iOS device but accessing an Android virtual mobile phone 514. As another example, the client device may be a personal computer executing a desktop class operating system (e.g., Windows, Linux, MacOS), but may access a virtual mobile with a mobile operating system.

The local application 504 may be any type of application being executed by a client device. The local application 504 may communication with the enterprise computer network 502 through a communication network 516. The communication network 515 may be any kind of communication network such as a local area network (LAN), metropolitan area network (MAN), and/or wide area network (WAN).

Figure 6:
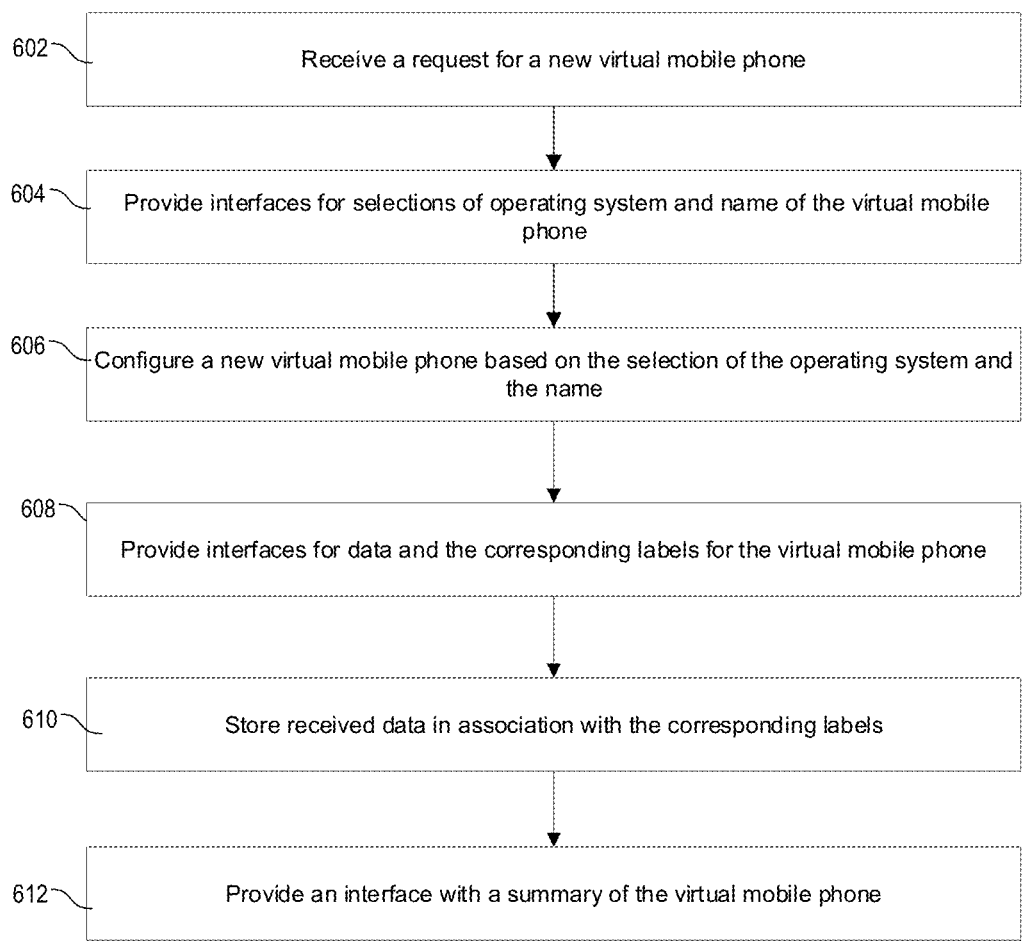
FIG. 6 depicts a flow diagram of an illustrative method of generating a virtual mobile phone.

FIG. 6 illustrates a flow diagram of an illustrative method 600 of generating a new virtual mobile phone. The method may 600 may be performed by any type of computing device (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C), or any combination thereof. However, for brevity, the following describes the method 600 being performed by a single computing device. It should also be understood that the shown steps of the method 600 are merely illustrative and additional, alternative, and fewer number of steps should be considered within the scope of this disclosure.

The method may begin at step 602 when the computing device may receive a request for a new virtual mobile phone. In some instances, the computing device may receive the request from an application running on a client device. The application running on the client device may be provided by an enterprise network associated with the computing device. In other instances, the computing device may receive the request from a browser environment on client device such as laptop computers and desktop computers. The computing device may receive the request from any kind of communication medium such as the Internet.

At a next step 604, the computing device may provide interfaces for selections of operating system and name of the virtual mobile phone. For instance, the computing device may transmit a plurality of instructions to the client device (and/or any other type of user computing device) to generate an interface with different options for the operating system. Some options for the operating system may include, iOS, Android operating system MS-Windows mobile operating system, and/or any other type of operating system. The interface may further also allow for the user to select different versions of the operating system. For the selection of the operating system and its version, the computing device may be agnostic to the operating system of the client device. For example, a client device may a personal computer but may request a virtual mobile with a mobile operating system. Furthermore, once generated, the computing device may execute the virtual mobile phone with the selected operating system, regardless of the operating system of the client device using the virtual mobile phone. Another interface, also based on the instructions from the computing device, may allow the user to name or label the virtual mobile phone. For instance, the user may provide a name such as "work phone" or "personal phone."

At a next step 606, the computing device may configure a new virtual mobile phone based on the received selection of the operating system and the name. In some instances, the computing device may retrieve a template corresponding to the selected operating system from a templates library (e.g., templates library 506 shown in FIG. 5) and configure the new virtual mobile phone based on the retrieved template. Furthermore, the computing device may associate the name (received in step 604) with the configured virtual mobile phone.

At a next step 608, the computing device may provide interfaces for data and corresponding labels for the virtual mobile phone. For instance, the computing device may transmit another plurality of instructions to the client device to generate an interface for the user to enter data and corresponding labels for the data. The user may enter data such as contacts, phone numbers, and/or any other types of data. The user may also use the interface to upload locally stored data, e.g., documents, photographs, voice memos, to a storage associated with the computing system. In addition to the data, the interface may allow the user to provide corresponding labels. For instance, a document may be associated with labels "work" and "confidential." In another instance, a photograph may be associated with labels "work" and "department 1."

At a next step 610, the computing device may store the received data in association with the corresponding labels. Pieces of data received from the client device may be associated with tags such as "personal" or "work," and the database containing these pieces of data may have these tags. For instance, a database structure may include a "label" or a "tag" field that the computing device may populate based on the received label. This type of labeled or tagged storage may allow for an efficient query of the database. For instance, when the computing device receives a data access request from a "work" virtual mobile phone, the computing device may just query the data records associated with the "work" tag.

At a next step 612, the computing device an interface with a summary of the virtual mobile phone. The summary may provide a snapshot view of the generated virtual mobile phone. The snapshot view may include the hardware configuration such as the memory capacity allocated to the virtual mobile phone. The snapshot view may also include the operating system (e.g., Android, iOS) for the virtual mobile phone and the additional applications, if any, installed on the virtual mobile phone. The snapshot view may further include other features such as security features (e.g., indicating the level of security associated with the virtual mobile phone), touch and feel aspects (e.g., background, color, etc. associated with the virtual mobile phone), and/or any other type of features associated with the virtual mobile phone.

Figure 7:
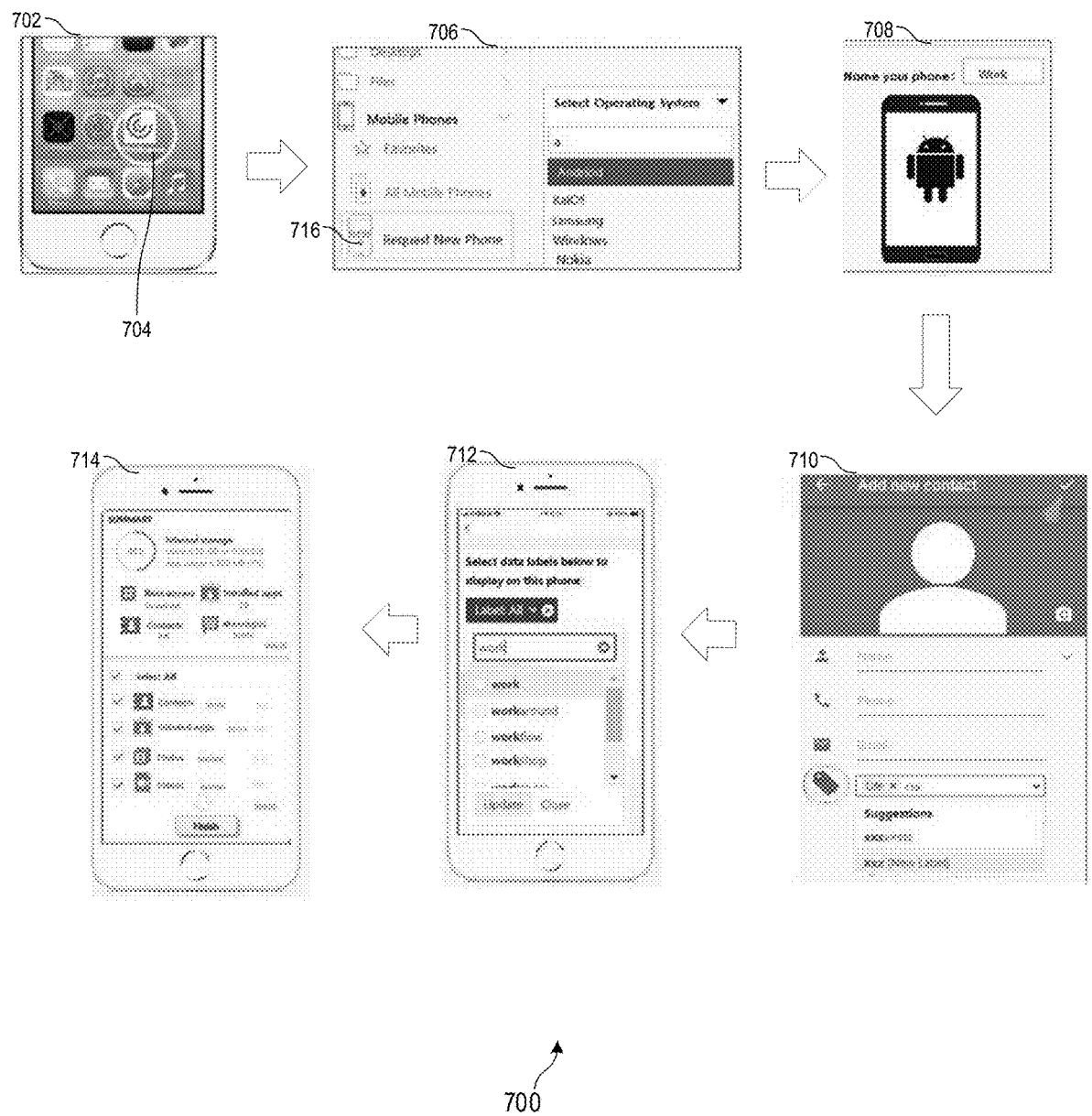
FIG. 7 depicts a process diagram of an illustrative method of generating a virtual mobile phone.

FIG. 7 depicts a process diagram of an example method 700 of generating a new virtual mobile phone. Any type of computing device (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C) or any combination thereof may implement the example method 700. However, for the sake of brevity, the following details a single client device 702 (e.g., computing device 107 in FIG. 1, computing device 240 in FIG. 2, computing devices 311-314 in FIG. 4, computing device 440 in FIGS. 4A-4C) performing all the steps of the method 700.

The client device 702 may have an application 704, which the user may select for execution by the client device 702. The application 704 may communicate with a computing device (e.g., a back-end enterprise server such as the one maintaining the platform 502 in FIG. 5) to provide a plurality of interfaces on the client device 702 for the user to generate and customize a new virtual mobile phone.

The application 704 may generate an interface 706 for the user to request a new virtual mobile phone and to select an operating system for the new virtual mobile phone. An icon 716 (e.g., indicating "Request New Phone") may allow the user to send a request to the back end enterprise server to generate a new virtual phone. The interface 706 may also allow the user to select an operating system for the new virtual phone (regardless of the operating system of the client device 702, e.g., as shown an Android operating system is being selected from an iOS device). Some examples of the operating systems, available for user selection, may include Android operating system, iOS, Samsung, Windows, or Nokia. The interface 706 may also show the existing virtual mobile phones (not shown). The user may select the existing virtual mobile phones for further customization.

After the selection of the operating system on the interface 706, the application 704 may generate another interface 708 for the user provide a name for the new virtual phone. The back-end server may maintain preset names, for examples, "work phone" or "personal phone." Additionally, the user may be able to customize the preset names or generate a new name. For instance, the user may customize the name to be "work phone—department 1." Or, the user may define a new name such as a "business phone." It is therefore to be understood that the user may select, customize, and/or define any name for the requested virtual phone.

After the user has generated and/or customized the name of the requested virtual phone, the application 704 may generate another interface 710 for the user to add data to the new virtual mobile phone. The data may include, for examples, contacts of the user. Other examples of data may include photographs, documents, voice memos, and/or any other type of data to be stored for the virtual mobile phone. In some instances, the interface 710 may allow the user to enter the directly in a form user interface. The user may manually enter information for a contact. In other instances, the interface 710 may allow the user to upload locally stored data to the back end server to make the data available for the virtual mobile phone. In other words, a locally stored piece of data may be transferred to the back end server such that accessing the data may become device agnostic (e.g., the stored data may be accessed from any client device interacting with the virtual mobile phone. In addition to the manual entry and upload, the interface may also allow data to be transferred from another device or a network. For instance, the interface 710 may allow the user to enter an identification of the another device or a web address within the network. The application 704 may communicate with the another device or a network component (e.g., server) associated with the web address to retrieve data and store the retrieved data to the back-end server.

In addition to allowing for the data entry, data upload, and/or data transfer, the application 704 may allow the user to provide a label for the data. For instance, the application may generate another interface 712 for the user to add labels to the data. For instance, the interface 712 may provide one or more predefine labels for the user to select, based on the name of the virtual phone provided by the user. The application 704 may automatically provide a label of "work" for the data from the user for a "work" virtual phone. Furthermore, based on the type of the document, the application 704 may auto-generate labels such as "work-document" or "work-report." The application 704 may allow the user to customize the auto-generated labels. In addition to the automatically generated labels or the customized labels based on the automatically generated labels, the application 704 may allow the user to define new labels. Regardless of the mode of the generation of the labels, the interface 712 may allow the user to associate the provided user data with one or more labels. It should be understood that a single piece of data may be associated with a plurality of labels, e.g., a document may be labeled as both "personal" and "work."

Finally, the application 704 may generate another interface 714, which may show a snapshot view (or a summary) of the newly created virtual mobile phone. The snapshot view may include, for example, hardware configuration of the virtual mobile phone. The snapshot view may further include, the amount of user data associated with the virtual mobile phone (e.g., number of contacts/photographs). The snapshot view may also include the number and/or types of applications installed in the virtual mobile phone. However, it should be understood that the above described information shown in the snapshot view in the interface 714 are merely illustrative and additional, alternative, or fewer pieces of the information may be included in the snapshot view.

Therefore, the process 700 may allow a user to request and customize a new virtual mobile phone. With proper credentials for authentication, the user may access the virtual mobile phone from any physical mobile phone. Because the session information is preserved, the user may be able to pause a virtual mobile phone session in a first client device and load the paused session in a second client device. In other words, the paused session may be able to seamlessly switch between different client devices while using the same virtual mobile phone.

Figure 8:
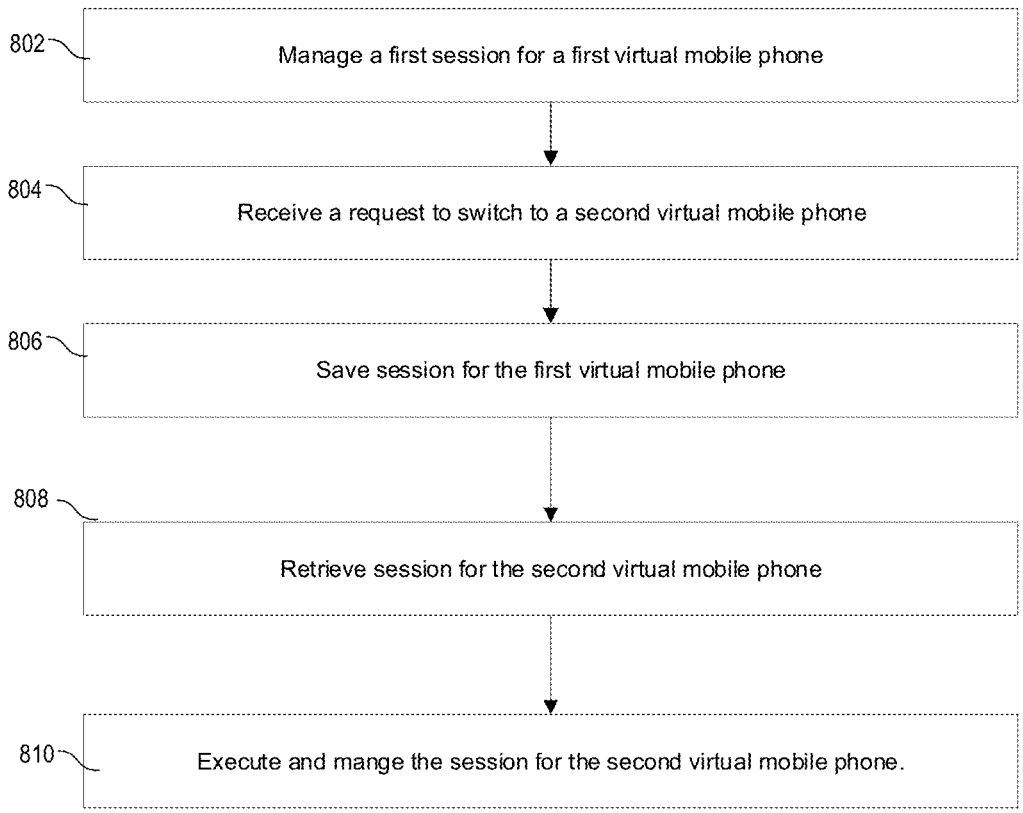
FIG. 8 depicts a flow diagram of an illustrative method of switching between different virtual mobile phones.

FIG. 8 depicts a flowchart of an illustrative method 800 for switching between different mobile phones. The method 800 may be executed by any computing device (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C) or any combination thereof. However, for the sake of brevity, the following describes all the steps of the method by a single computing device. Furthermore, it should be understood that the steps of the method 800 described herein are merely illustrative and additional, alternative, and fewer number of steps should also be considered within the scope of this disclosure.

At a first step 802, a computing device may manage (or maintain) a first session for a first virtual mobile phone. During this step, the computing device may provide a back-end functionality of the first virtual mobile phone that may be interfacing an user through an application executing on a client device. The back-end session management functionality may include receiving communication originating from the first virtual mobile phone, sending communication to the first virtual mobile phone, storing the data received from the first virtual mobile phone, generating data queries based on data request from the first virtual mobile phone, and/or any other session management functionality associated with the first virtual mobile phone. The first virtual mobile phone may have a first operating system.

At step 804, the computing device may receive a request to switch to a second virtual mobile phone. The request may originate from the application being executed by the client device, which may show an indication of the current virtual mobile phone in session (e.g., the first virtual mobile phone) and another indication with the available second virtual mobile phone the user may switch to. The first and the second virtual mobile phones may have been previously generated by the user for different purposes (e.g., using the method 600 and/or method 700), and with different operating system. For instance, the first virtual mobile phone may be for "personal" purposes and the second virtual mobile phone, with a second operating system different from the first operating system, may be for "work" purposes. During the current session of the first "personal" virtual mobile phone with a first operating system, the user may desire to switch to the second "work" mobile phone with a second operating system, and make a selection for the switch (e.g., by selecting an icon for the second virtual mobile phone).

At step 806, the computing device may save the session for the first virtual mobile phone. For instance, in response to the switching request (step 804 above), the computing device may store the current data associated with the first session. The current data may include documents being edited by the user through the first virtual mobile phone, incoming communication from the first virtual mobile phone, outbound communication to the first virtual mobile phone. In addition to these, the computing device may store other information such as the IP address of the client device executing the application rendering the first virtual mobile phone, timestamp associated with the switching request, and/or any other information associated with the session for the first virtual mobile phone.

At step 808, the computing device may retrieve a session for the second virtual mobile phone. For instance, the user may have been using the second virtual mobile phone prior to switching to the first virtual mobile phone. Based on this switching request (i.e., from the second virtual mobile phone to the first virtual mobile phone), the computing device may have stored the session for the second virtual mobile phone, retrieved by the computing device during this step. The retrieved session may include, for example, documents associated with the second virtual mobile phone, incoming communications from the second virtual mobile phone, outgoing communications to the second virtual mobile phone, IP address of the device that the second virtual mobile phone was last accessed from, and/or any other type of information associated with the second virtual mobile phone.

At step 810, the computing device may execute and manage the session for the second virtual mobile phone. The computing device may, for instance, based on the retrieved session for the second virtual mobile phone, receive inbound communication from the second virtual mobile phone, transmit outbound communication to the second virtual mobile phone, resume processing of data associated with the second virtual mobile phone (e.g., continue editing a document associated with the second virtual mobile phone), and/or perform any other tasks related with the second virtual phone. The computing device may continue managing the session for the second virtual mobile phone until the computing device receives another switching request (e.g., switching request to switch to the first virtual mobile phone or another mobile phone).

It should be understood that as the session is stored at the back end server, the user may switch the virtual mobile phones across different physical mobile phones, which may have different operating systems. For instance, using the method 800, the user may use a first virtual mobile phone from a first client device and switch the second virtual mobile phone in the first client device. The user may use a second client device to switch back to the first virtual mobile phone. Because the session management may be performed by a back-end platform, the use of the different virtual mobile phones therefore may be device agnostic (e.g., the user may be able to seamlessly switch between different physical client devices with a minimal effect on the virtual mobile phones).

It should also be understood that although the method 800 describes a switching from the first virtual mobile phone to the second virtual mobile phone, the computing device may simultaneously have multiple sessions to support multiple virtual mobile phone for a the user. For instance, based on the switching request (step 804), the computing device may not pause or stop the session for the first virtual mobile phone. Instead, the computing device may execute the session of the second virtual mobile phone simultaneous with the session of the first virtual mobile phone. Therefore, the user may be able access both the first and the second virtual mobile phones simultaneously, either from a single client device or from multiple client devices, regardless of the operating systems of the client devices.

Figure 9:
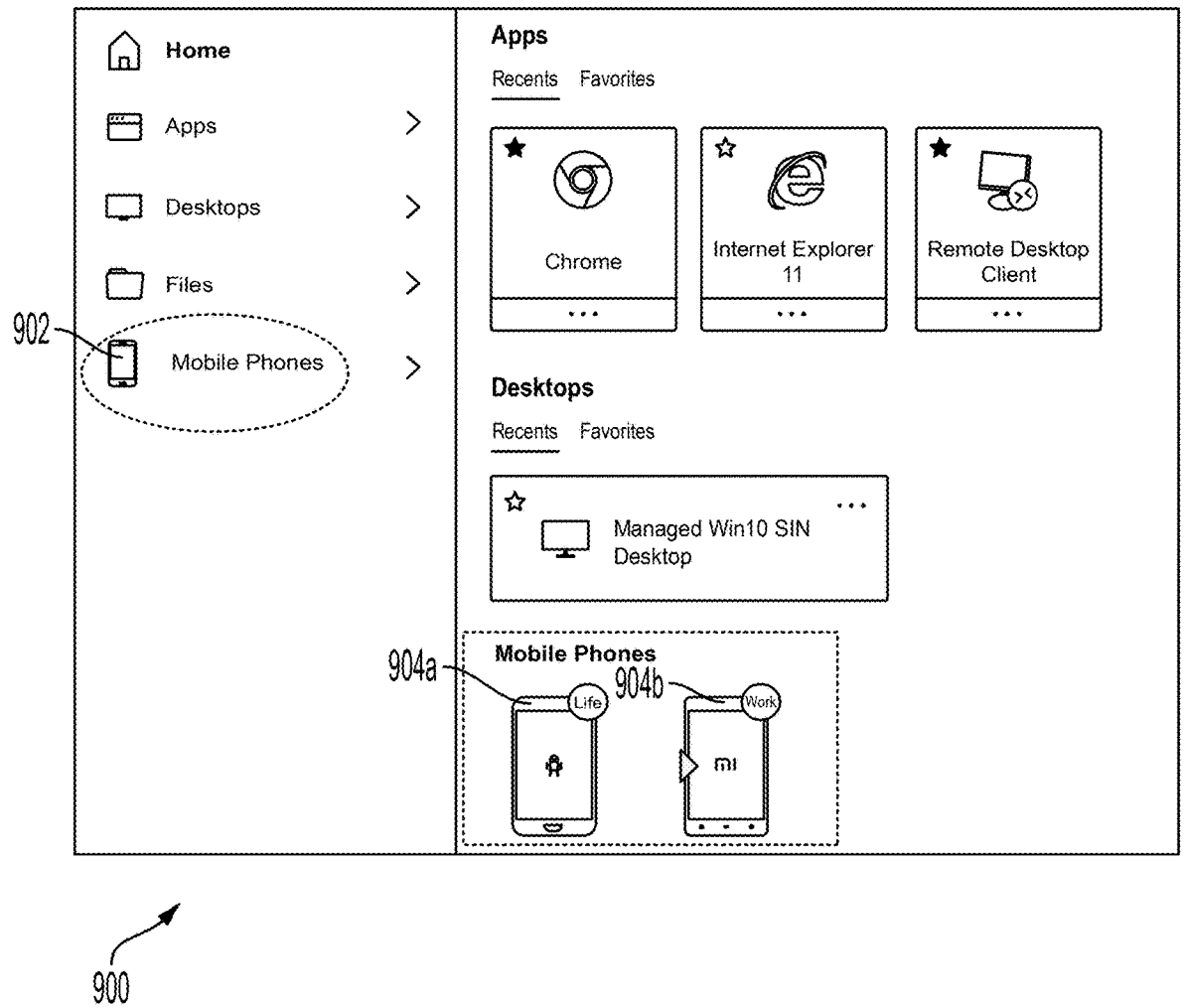
FIG. 9 depicts an illustrative interface for accessing multiple virtual mobile phones.

FIG. 9 depicts an illustrative interface 900 for switching between different virtual mobile phones. The interface 900 may be generated by any kind of computing device (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C) or any combination thereof. However, for the sake of brevity, the following describes a computing device generating the interface 900.

The interface 900 may display an icon 902, which may allow selection of and/or switching between different virtual mobile phones. Upon selection of the icon 902, the interface may display icons for a first virtual mobile phone 904a and a second virtual mobile phone 904b. For instance, the first virtual mobile phone 904a may be labeled as "life" and may be used a as a personal mobile phone. The second virtual mobile phone 904b may be labeled as "work" and may be used as a work mobile phone. A computing device may configure the first virtual mobile phone 904a and the second virtual mobile phone 904b with different operating systems and/or different applications, based on the configuration request of the user.

The user may select the corresponding icon to select the first virtual mobile phone 904a or the second virtual mobile phone 904b. Additionally, if the user is using the first virtual mobile phone 904a and wishes to switch to the second virtual mobile phone 904b, the user may select the icon corresponding to the second virtual mobile phone 904b to cause the switching to the second virtual mobile phone 904b. Alternatively, the user may select the icon corresponding to the second virtual mobile phone 904b to simultaneously access both the first virtual mobile phone 904a and the second virtual mobile phone 904b.

The following paragraphs (M1) through (M20) describe examples of methods that may be implemented in accordance with the present disclosure.

(M1) A method comprising maintaining, by a computing device, a first session for a first virtual mobile phone; receiving a request to switch from the first virtual mobile phone to a second virtual mobile phone; storing first session data associated with the first session; retrieving second session data associated with a second session for the second virtual mobile phone; and providing the second virtual mobile phone based on the retrieved second session data.

(M2) A method may be performed as described in paragraph (M1), further comprising: providing first virtual mobile phone and the second virtual mobile phone to a single client device.

(M3) A method may be performed as described in paragraph (M1) through (M2), wherein the first virtual mobile phone is associated with a first user-provided label and the second virtual mobile phone is associated with a second user-provided label.

(M4) A method may be performed as described in any of paragraphs (M1) through (M3), further comprising: receiving a first data during the first session; storing the first data in association with a first set of labels associated with the first virtual mobile phone; receiving a second data during the second session; and storing the second data in association with a second set of labels associated with the second virtual mobile phone.

(M5) A method may be performed as described in any of paragraphs (M1) through (M4), further comprising: receiving a second request to switch from the second virtual mobile phone to the first virtual mobile phone; storing an updated second session data associated with the second session; retrieving the first session data; and providing the first virtual mobile phone based on the retrieved first session data.

(M6) A method may be performed as described in any of paragraphs (M1) through (M5), wherein the second virtual mobile phone is provided to a first client device, the method further comprising: receiving a second request to switch the second virtual mobile phone from the first client device to a second client device; updating the second session data to generate an updated second session data; and providing, to the second client device, the second virtual mobile phone based on the updated second session data.

(M7) A method may be performed as described in any of paragraphs (M1) through (M6), wherein the request to switch from the first virtual mobile phone to the second mobile phone is received from an application being executed by a client device.

(M8) A method may be performed as described in any of paragraphs (M1) through (M7), wherein the first virtual mobile phone is associated with a first operating system and wherein the second virtual mobile phone is associated with a second operating system, at least one of the first operating system or the second operating system being different from an operating system associated with client device accessing the first virtual mobile phone and the second virtual mobile phone.

(M9) A method may be performed as described in any of paragraphs (M1) through (M8), wherein the first virtual mobile phone is associated with a first level of security and the second virtual mobile phone is associated with a second level of security.

(M10) A method may be performed as described in any of paragraphs (M1) through (M9), further comprising: providing an interface to allow a user to send the request to switch from the first virtual mobile phone to the second virtual mobile phone.

(M11) A method comprising receiving, by a computing device, a request to generate a virtual mobile phone; selecting an operating system for the virtual mobile phone based on a first input received from a client device; receiving, from the client device, data for the virtual mobile phone; assigning a set of labels to the data based on a second set of inputs received from the client device; and generating the virtual mobile phone based on the selected operating system, the received data, and the assigned set of labels.

(M12) A method may be performed as described in paragraph (M11), further comprising causing to display: a first interface on the client device for a user to provide the first input; a second interface on the client device for the user to provide the data; and a third interface on the client device for the user to provide the second set of inputs (M13) A method may be performed as described in any of paragraphs (M11) through (M12), wherein at least one of the first, second, or the third interface is displayed by an application being executed by the client device.

(M14) A method may be performed as described in any of paragraphs (M11) through (M13), further comprising: receiving from the client device a configuration request for the virtual mobile phone; and generating the virtual mobile phone further based on the configuration request.

(M15) A method may be performed as described in any of paragraphs (M11) through (M14), wherein the configuration request includes at least one of: an application to be installed on the virtual mobile phone; level of security for the virtual mobile phone; hardware capacity of the virtual mobile phone; or a look and feel attribute of the virtual mobile phone.

(M16) A method may be performed as described in any of paragraphs (M11) through (M15), further comprising: receiving a second request to generate a second virtual mobile phone; selecting a second operating system for the second virtual mobile phone based on a third input received from a client device; receiving the client device, second data for the second virtual mobile phone; assigning a second set of labels to the second data based on a fourth set of inputs received from the client device; and generating the second virtual mobile phone based on the selected second operating system, the received second data, and the assigned second set of labels.

(M17) A method may be performed as described in any of paragraphs (M11) through (M16), wherein the operating system is different from the second operating system.

(M18) A method may be performed as described in any of paragraphs (M11) through (M17), further comprising: receiving a first access request to access the virtual mobile phone; initiating a first session for the virtual mobile phone; receiving a second access request to access the second virtual mobile phone; and initiating a second session for the second virtual mobile phone.

(M19) A method may be performed as described in any of paragraphs (M11) through (M18), further comprising: concurrently executing the first session and the second session.

(M20) A method may be performed as described in any of paragraphs (M11) through (M19), further comprising: initiating the second session after stopping the first session.

The following paragraphs (A1) through (A8) describe examples of apparatuses that may be implemented in accordance with the present disclosure.

(A1) An apparatus comprising at least one processor; memory storing instructions that, when executed by the at least one processor, cause the apparatus to: maintain a first session for a first virtual mobile phone; receive a request to switch from the first virtual mobile phone to a second virtual mobile phone; store first session data associated with the first session; retrieve second session data associated with a second session for the second virtual mobile phone; and provide the second virtual mobile phone based on the retrieved second session data.

(A2) An apparatus as described in paragraph (A1), wherein the memory further stores instructions that when executed by the at least one processor, cause the apparatus to: provide first virtual mobile phone and the second virtual mobile phone to a single client device.

(A3) An apparatus as described in any of the paragraphs (A1) through (A2), wherein the first virtual mobile phone is associated with a first user-provided label and the second virtual mobile phone is associated with a second user-provided label.

(A4) An apparatus as described in any of paragraphs (A1) through (A3), wherein the memory further stores instructions that when executed by the at least one processor, cause the apparatus to: receive a first data during the first session; store the first data in association with a first set of labels associated with the first virtual mobile phone; receive a second data during the second session; and store the second data in association with a second set of labels associated with the second virtual mobile phone.

(A5) An apparatus as described in any of paragraphs (A1) through (A4), wherein the memory further stores instructions that when executed by the at least one processor, cause the apparatus to: receive a second request to switch from the second virtual mobile phone to the first virtual mobile phone; store an updated second session data associated with the second session; retrieve the first session data; and provide the first virtual mobile phone based on the retrieved first session data.

(A6) An apparatus as described in any of paragraphs (A1) through (A5), wherein the second virtual mobile phone is provided to a first client device, wherein the memory further stores instructions that when executed by the at least one processor, cause the apparatus to: receive a second request to switch the second virtual mobile phone from the first client device to a second client device; update the second session data to generate an updated second session data; and provide, to the second client device, the second virtual mobile phone based on the updated second session data.

(A7) An apparatus as described in any of paragraphs (A1) through (A6), wherein the request to switch from the first virtual mobile phone to the second mobile phone is received from an application being executed by a client device.

(A8) An apparatus as described in any of paragraphs (A1) through (A7), wherein the first virtual mobile phone is associated with a first operating system and wherein the second virtual mobile phone is associated with a second operating system, at least one of the first operating system or the second operating system being different from an operating system associated with client device accessing the first virtual mobile phone and the second virtual mobile phone.

(A9) An apparatus as described in any of paragraphs (A1) through (A8), wherein the first virtual mobile phone is associated with a first level of security and the second virtual mobile phone is associated with a second level of security.

(A10) An apparatus as described in any of paragraphs (A1) through (A9), wherein the memory further stores instructions that when executed by the at least one processor, cause the apparatus to: provide an interface to allow a user to send the request to switch from the first virtual mobile phone to the second virtual mobile phone.

(A11) An apparatus comprising at least one processor; memory storing instructions that, when executed by the at least one processor, cause the apparatus to: receive a request to generate a virtual mobile phone; select an operating system for the virtual mobile phone based on a first input received from a client device; receive, from the client device, data for the virtual mobile phone; assign a set of labels to the data based on a second set of inputs received from the client device; and generate the virtual mobile phone based on the selected operating system, the received data, and the assigned set of labels (A12) An apparatus as described in paragraph (A11), wherein the memory further stores instructions that when executed by the at least one processor, cause the apparatus to: cause to display: a first interface on the client device for a user to provide the first input; a second interface on the client device for the user to provide the data; and a third interface on the client device for the user to provide the second set of inputs.

(A13) An apparatus as described in any of the paragraphs (A11) through (A12), wherein at least one of the first, second, or the third interface is displayed by an application being executed by the client device.

(A14) An apparatus as described in any of paragraphs (A11) through (A13), wherein the memory further stores instructions that when executed by the at least one processor, cause the apparatus to: receive from the client device a configuration request for the virtual mobile phone; and generate the virtual mobile phone further based on the configuration request (A15) An apparatus as described in any of paragraphs (A11) through (A14), wherein the configuration request includes at least one of: an application to be installed on the virtual mobile phone; level of security for the virtual mobile phone; hardware capacity of the virtual mobile phone; or a look and feel attribute of the virtual mobile phone.

(A16) An apparatus as described in any of paragraphs (A11) through (A15), wherein the memory further stores instructions that when executed by the at least one processor, cause the apparatus to: receive a second request to generate a second virtual mobile phone; select a second operating system for the second virtual mobile phone based on a third input received from a client device; receive the client device, second data for the second virtual mobile phone; assign a second set of labels to the second data based on a fourth set of inputs received from the client device; and generate the second virtual mobile phone based on the selected second operating system, the received second data, and the assigned second set of labels.

(A17) An apparatus as described in any of paragraphs (A11) through (A16), wherein the operating system is different from the second operating system.

(A18) An apparatus as described in any of paragraphs (A11) through (A17), wherein the memory further stores instructions that when executed by the at least one processor, cause the apparatus to: receive a first access request to access the virtual mobile phone; initiate a first session for the virtual mobile phone; receive a second access request to access the second virtual mobile phone; and initiate a second session for the second virtual mobile phone.

(A19) An apparatus as described in any of paragraphs (A11) through (A18), wherein the memory further stores instructions that when executed by the at least one processor, cause the apparatus to: concurrently execute the first session and the second session (A20) An apparatus as described in any of paragraphs (A11) through (A19), wherein the memory further stores instructions that when executed by the at least one processor, cause the apparatus to: initiating the second session after stopping the first session.

The following paragraphs (CRM1) through (CRM20) describe examples of computer-readable media that may be implemented in accordance with the present disclosure.

(CRM1) A non-transitory computer-readable medium storing instructions, that, when executed, cause the system to: maintain a first session for a first virtual mobile phone; receive a request to switch from the first virtual mobile phone to a second virtual mobile phone; store first session data associated with the first session; retrieve second session data associated with a second session for the second virtual mobile phone; and provide the second virtual mobile phone based on the retrieved second session data.

(CRM2) A non-transitory computer-readable medium as described in paragraph (CRM1), wherein the instructions, when executed, cause the system to: provide first virtual mobile phone and the second virtual mobile phone to a single client device.

(CRM3) A non-transitory computer-readable medium as described in any of the paragraphs (CRM1) through (CRM2), wherein the first virtual mobile phone is associated with a first user-provided label and the second virtual mobile phone is associated with a second user-provided label.

(CRM4) A non-transitory computer-readable medium as described in any of paragraphs (CRM1) through (CRM3), wherein the instructions, when executed, cause the system to: receive a first data during the first session; store the first data in association with a first set of labels associated with the first virtual mobile phone; receive a second data during the second session; and store the second data in association with a second set of labels associated with the second virtual mobile phone.

(CRM5) A non-transitory computer-readable medium as described in any of paragraphs (CRM1) through (CRM4), wherein the instructions, when executed, cause the system to: receive a second request to switch from the second virtual mobile phone to the first virtual mobile phone; store an updated second session data associated with the second session; retrieve the first session data; and provide the first virtual mobile phone based on the retrieved first session data.

(CRM6) A non-transitory computer-readable medium as described in any of paragraphs (CRM1) through (CRM5), wherein the instructions, when executed, cause the system to: receive a second request to switch the second virtual mobile phone from the first client device to a second client device; update the second session data to generate an updated second session data; and provide, to the second client device, the second virtual mobile phone based on the updated second session data.

(CRM7) A non-transitory computer-readable medium as described in any of paragraphs (CRM1) through (CRM6), wherein the request to switch from the first virtual mobile phone to the second mobile phone is received from an application being executed by a client device.

(CRM8) A non-transitory computer-readable medium as described in any of paragraphs (CRM1) through (CRM7), wherein the first virtual mobile phone is associated with a first operating system and wherein the second virtual mobile phone is associated with a second operating system, at least one of the first operating system or the second operating system being different from an operating system associated with client device accessing the first virtual mobile phone and the second virtual mobile phone.

(CRM9) A non-transitory computer-readable medium as described in any of paragraphs (CRM1) through (CRM8), wherein the first virtual mobile phone is associated with a first level of security and the second virtual mobile phone is associated with a second level of security.

(CRM10) A non-transitory computer-readable medium as described in any of paragraphs (CRM1) through (CRM9), wherein the instructions, when executed, cause the system to: provide an interface to allow a user to send the request to switch from the first virtual mobile phone to the second virtual mobile phone.

(CRM11) A non-transitory computer-readable medium comprising at least one processor; memory storing instructions that, when executed, cause a system to: receive a request to generate a virtual mobile phone; select an operating system for the virtual mobile phone based on a first input received from a client device; receive, from the client device, data for the virtual mobile phone; assign a set of labels to the data based on a second set of inputs received from the client device; and generate the virtual mobile phone based on the selected operating system, the received data, and the assigned set of labels (CRM12) An non-transitory computer-readable medium as described in paragraph (CRM11), wherein the instructions, when executed, cause the system to: cause to display: a first interface on the client device for a user to provide the first input; a second interface on the client device for the user to provide the data; and a third interface on the client device for the user to provide the second set of inputs.

(CRM13) An non-transitory computer-readable medium as described in any of the paragraphs (CRM11) through (CRM12), wherein at least one of the first, second, or the third interface is displayed by an application being executed by the client device.

(CRM14) An non-transitory computer-readable medium as described in any of paragraphs (CRM11) through (CRM13), wherein the instructions, when executed, cause the system to: receive from the client device a configuration request for the virtual mobile phone; and generate the virtual mobile phone further based on the configuration request (CRM15) An non-transitory computer-readable medium as described in any of paragraphs (CRM11) through (CRM14), wherein the configuration request includes at least one of: an application to be installed on the virtual mobile phone; level of security for the virtual mobile phone; hardware capacity of the virtual mobile phone; or a look and feel attribute of the virtual mobile phone.

(CRM16) An non-transitory computer-readable medium as described in any of paragraphs (CRM11) through (CRM15), wherein the instructions, when executed, cause the system to: receive a second request to generate a second virtual mobile phone; select a second operating system for the second virtual mobile phone based on a third input received from a client device; receive the client device, second data for the second virtual mobile phone; assign a second set of labels to the second data based on a fourth set of inputs received from the client device; and generate the second virtual mobile phone based on the selected second operating system, the received second data, and the assigned second set of labels.

(CRM17) An non-transitory computer-readable medium as described in any of paragraphs (CRM11) through (CRM16), wherein the operating system is different from the second operating system.

(CRM18) An non-transitory computer-readable medium as described in any of paragraphs (CRM11) through (CRM17), wherein the instructions, when executed, cause the system to: receive a first access request to access the virtual mobile phone; initiate a first session for the virtual mobile phone; receive a second access request to access the second virtual mobile phone; and initiate a second session for the second virtual mobile phone.

(CRM19) An non-transitory computer-readable medium as described in any of paragraphs (CRM11) through (CRM18), wherein the instructions, when executed, cause the system to: concurrently execute the first session and the second session (CRM20) An non-transitory computer-readable medium as described in any of paragraphs (CRM11) through (CRM19), wherein the instructions, when executed, cause the system to: initiating the second session after stopping the first session.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a server and from a client device, a first user-provided label associated with a first session for a first virtual mobile phone, wherein the first virtual mobile phone executes a first operating system;
receiving, by the server and from the client device, a second user-provided label associated with a second session for a second virtual mobile phone, wherein the second virtual mobile phone executes a second operating system different from the first operating system;
receiving, from the client device, a request to switch from the first virtual mobile phone to the second virtual mobile phone;
storing, in association with the first user-provided label, first session data associated with the first session;
retrieving second session data associated with the second session for the second virtual mobile phone; and
providing, to the client device via a local application executing on the client device and based on the retrieved second session data, the second virtual mobile phone, enabling the client device to operate the second session for the second virtual mobile phone.

2. The method of claim 1, further comprising:
providing the first virtual mobile phone to the client device.

3. The method of claim 1, further comprising:
receiving a first data during the first session;
storing the first data in association with the first user-provided label;
receiving a second data during the second session; and
storing the second data in association with a second user-provided label.

4. The method of claim 1, further comprising:
receiving a second request to switch from the second virtual mobile phone to the first virtual mobile phone;
storing an updated second session data associated with the second session;
retrieving the first session data; and
providing the first virtual mobile phone based on the retrieved first session data.

5. The method of claim 1, further comprising:
receiving a second request to switch the second virtual mobile phone from the client device to a second client device;
updating the second session data to generate an updated second session data; and
providing, to the second client device, the second virtual mobile phone based on the updated second session data.

6. The method of claim 1, wherein the request to switch from the first virtual mobile phone to the second virtual mobile phone is received from the local application being executed by the client device.

7. The method of claim 1, wherein the first virtual mobile phone is associated with a first level of security and the second virtual mobile phone is associated with a second level of security.

8. The method of claim 1, further comprising:
providing an interface to allow a user to send the request to switch from the first virtual mobile phone to the second virtual mobile phone.

9. The method of claim 1, wherein the first operating system is an Android operating system; and
wherein the second operating system is a non-Android operating system.

10. The method of claim 1, wherein the first operating system is an iOS operating system; and
wherein the second operating system is a non-iOS operating system.

11. The method of claim 1, wherein the first operating system is an MS-Windows operating system; and
wherein the second operating system is a non-MS-Windows operating system.

12. The method of claim 1, further comprising:
receiving, by the server and from the client device, a second data and a second request to store the second data in association with the second user-provided label; and
storing, in association with the second user-provided label, the second data.

* * * * *